Patented Sept. 27, 1927.

1,643,447

UNITED STATES PATENT OFFICE.

EDOUARD JEAN PAUL CLAUDE DE JARNY, OF BRY-SUR-MARNE, FRANCE.

PROCESS OF MANUFACTURING CONDENSATION PRODUCTS FROM PHENOLS AND FORMALDEHYDES.

No Drawing. Application filed April 6, 1926, Serial No. 100,180, and in France April 16, 1925.

It is generally known that, in moulding Bakelite articles, the procedure is as follows:

While still in the state of a fusible resin (saliretine) Bakelite is intimately mixed with complementals and the mixture is next powderized to constitute the moulding powder. Said moulding powder is introduced into metal (generally steel) moulds and submitted to combined heat and pressure action; that is to say, the moulds filled with powder are mechanically clamped between hydraulic press plates and, while so held, heated by means of any convenient heater, gas, steam, hot oil etc., up to 120–180° C. during a time that varies according to the dimensions of the articles treated. Under the influence of temperature saliretine passes quickly to the next higher stage (resitol) and thence to final stage (resite).

This method of operation unavoidably involves limitation of mouldings to articles of so-called "stripping"-form (that is to say freely removable from the mould by merely turning the latter upside down) or to coins or articles made in stamping blocks.

For example, holes parallel to the direction of pressure cannot be pierced completely through moulding, since the powder first becomes compressed on the heads of the steel spindles used to form those holes, thus causing said spindles to undergo forcible distortion. In practice, therefore, only blind holes are formed which have afterwards to be drilled through.

Due to the above and other reasons it is estimated that about four fifths of ordinary Bakelite articles cannot be moulded without having to be afterwards submitted to the various machinings required in the same circumstances for moulded pieces made of common plastic materials such as, say, ebonite or galalith.

Furthermore, Bakelite as compared with these substances, offers the additional and extra inconvenience of being far less adapted than they for such machinings, pressed and hardened Bakelite being, in fact, very hard and having a dry and slightly horny texture, which explains why ebonite is even now favoured wherever final machining is required, despite the undeniable superiority of Bakelite products for most uses.

Again, compression powder moulding is hardly practical where the calculated sizes or dimensions have to be strictly complied with under the same pressure constants, for, in such cases, the pulverulent material has of necessity to be very accurately weighed before it is introduced into the moulds, a nicety which, indeed, interferes largely with commercial production.

One object of the present invention is to do away with the foregoing drawbacks, inasmuch as said invention provides means for manufacturing from phenols and formaldehyde in the presence of alkaline-earth chlorides condensation products which, unlike Bakelite, do not yield resinous masses but plastic, cold-kneadable masses capable of being moulded in a practical manner by injection at all the stages of polymerization previous to final state.

The process which is the object of this invention and according to which said new condensation products can be manufactured consists essentially in heating phenols together with aqueous formaldehyde while using an amount of catalyzer exceeding 15% of the formaldehyde solution employed, until there are formed masses plastic, cold-kneadable and soluble both in acetone and in alcohol.

I am aware that there has been proposed in the prior art the use as contact bodies (condensing agents) of alkaline-earth chlorides (say, calcium chloride) for manufacturing condensation bodies from phenol and from formaldehyde.

With said prior processes, however, calcium chloride is used in very small quantities and has been indicated (Baekeland, No. 942,699, December 7, 1909, lines 95 to 114) chiefly as a means to remove water from the phenol-formaldehyde mixture. When used in such small quantities, calcium chloride is powerless to render plastic and cold-kneadable either the initial product or the intermediate products of the stages preceding the final stage. The phenol-formaldehyde mixture must always pass through the fusible resin (saliretine) stage to reach final condition. Indeed, at the stage corresponding to plastic saligenine, the product, when injected into the moulds, can be made to mix with inert complementals and, in this way, the mould can be very exactly filled.

But saligenine offers very high fusibility and, as has been clearly set forth hereinabove only when passed beyond the subsequent stages is it fit to yield the final product. It would, therefore, melt under the very earliest effects of intensive heating and so leak out through the joints of the mould wherein only the inert complementals would remain.

French Patent No. 563,777, dated June 27, 1922, also describes the use of alkaline-earth chlorides as condensing agents, as well as a method for obtaining a cold-plastic material, but the 15% quota of formaldehyde solution indicated as usable according to said patent is inadequate to permit a material to be obtained which is cold-kneadable at all the polymerization stages preceding the final one. Cold-kneadability cannot, therefore, obtain beyond the resol stage, for beyond this stage the mass resumes resinous texture as with any other condensing agent.

On increasing, on the contrary, the amount of alkaline-earth chloride, (especially $CaCl_2$ beyond said quota, that is to say to 25-30% or more of the formaldehyde solution used, it has been found that the obtained mass will remain kneadable at all polymerizing stages, however high, before the final one. Said mass can then be cold-mangled or rolled like a natural rubber gum and any inert material can be incorporated thereinto at any stage without the help of any solvent while—and this is another advantage unsuggested in any of the prior processes—it can be introduced, complemented as above, into a cope provided with a forcing piston, and made by mechanical pressure to fill, without any danger to the moulds and successively, as many of said moulds as the plastic material contained in the cope will allow.

From the above set forth fact very considerable industrial advantages are derived, of which the main ones are as follows:

(a) Possibility of moulding any piece or article whatsoever, however complicated the form thereof, and of piercing holes perpendicular or parallel to the direction of pressure completely through the same. In all cases the pieces, articles or parts come from the moulds entirely finished without any further machining being required.

(b) Moulds reduced to utmost simplicity.

(c) Saving in manufacturing time. A few minutes suffice for filling the mould to a nicety, the injection pressure gauge permitting control of the amount of plastic material introduced.

(d) Always obtaining articles or parts of exactly the same size, the same quantities of material being always, as above explained, introduced into the moulds under the same pressure constant.

(e) Absolutely constant dielectric, the amount of gases liberated being very small in the course of reactions at the various stages passed through towards the final one, while, as compared with weight-cast pieces of the same volume, the injection-moulded pieces are, moreover, molecularly far tougher.

It was not suspected heretofore that by heating the phenol and formaldehyde solution in the presence of a quantity of catalyzing agent exceeding 15% of the formaldehyde solution there would be formed masses that would prove plastic and cold-kneadable at all stages preceding the final one, and, consequently, adapted for moulding by the injection process in order to make useful articles of manufacture.

As a matter of fact, nowhere in the publications relating to the art has there hitherto been made any reference to the importance of using tolerably large amounts of alkaline-earth chlorides for achieving condensation products from phenol and formaldehyde.

In order to explain thoroughly the scope of the invention and to give a definite example of an embodiment thereof showing the method of making articles of manufacture with masses obtained according to the new process, the four main operations involved in such manufacture, will be reviewed:

1. Obtaining plastic and cold-kneadable masses.
2. Mixing up inert complementals.
3. Moulding articles of manufacture.
4. Intensive heating of formed articles in moulds or without moulds.

1. For making plastic and pliant masses I can use, for instance, the following mixtures:

|   | Grams |
|---|---|
| 1. Metaparacresol | 1500 |
| 40% formaldehyde | 1250 |
| Dry calcium chloride | 350 |
| 2. Raw phenol | 1500 |
| 40% formaldehyde | 1000 |
| Dry calcium chloride | 250 |
| 3. Metaparacresol | 2500 |
| Tricresol | 750 |
| 40% formaldehyde | 2400 |
| Dry calcium chloride | 560 |
| 4. Metacresol | 1000 |
| 40% formaldehyde | 1000 |
| Dry calcium chloride | 300 |
| or else |  |
| 5. Tricresol | 1000 |
| 40% formaldehyde | 600 |
| Dry calcium chloride | 200 | and other suchlike mixtures.

Said mixtures can be suitably modified according to the uses for which the manufactured articles are intended. I find it a good plan that the calcium chloride be dissolved in formaldehyde and that the solution so obtained be added to phenol. The whole is then placed in a container provided with an upflow cooling device or, more simply, in a digester which is heated to boiling temperature of the lower layer of the mixture (dissolution of calcium chloride in formaldehyde). Said boiling temperature (110° C.) is to be maintained during the entire operation, that is to say until the desired stage of condensation is obtained. Operating duration is governed by the amounts treated and by the stage of condensation desired to be obtained. For instance, the making of a 1500 gram mass of plastic and kneadable stuff suitable for the manufacture of insulating parts for industrial electric purposes requires a condensing operation of one hour (30 minutes up to boiling and 30 minutes continuous boiling).

Of course, the process can be interrupted at any stage of polymerization, and, consequently, it is possible to obtain masses offering various properties depending on the stage at which interruption takes place. The mass obtained by the present method, however, is always plastic and cold-kneadable whatever the stage at which the operation stops. If it proceeds to the final stage, a hard and insoluble mass is obtained. Said mass is insoluble both in acetone and in alcohol, its solubility decreasing in direct ratio to the extent to which the reaction is carried while its kneadability is not substantially altered. The polymerzing stage at which the operation is to be stopped is governed by the purpose for which the condensation product to be made is intended. No account need be taken, however, of the time likely to elapse between the making of the product and its utilization, for polymerization keeps going on slowly after cooling. Condensation proceeds more rapidly when a temperature higher than 110° C. is used. But, in this case, the stage of condensation and the interruption of the reaction stage have to be watched more closely, chiefly when large quantities are being treated. There is no need to expel the water of condensation in the course of operation as has to be done with hitherto known processes. As soon as condensation begins the product (whatever the stage it is passing through) assumes a gelatinous consistency and rids itself of the water which thus exhausts from the combination both physically and chemically. Per contra, with hitherto known processes, the water of condensation is absorbed by the artificial resin masses. Most serious difficulties are thus encountered in afterwards eliminating said water from the condensation product, so serious, indeed, that such elimination can be considered as almost unfeasible. This is why water has to be eliminated through evaporation in the course of the condensing stage and, from the manufacturer's point of view, account must be taken of the inconveniences unavoidably incidental to such operation (work in vacuum, part of the formaldehyde solution carried off etc.)

Resulting from the fact that the mass obtained according to the new process automatically rids itself of the water of condensation, this invaluable advantage is secured that, when treating large masses of material, it is possible to interrupt the condensation stage suddenly, inasmuch as for this purpose the condensation product is plunged rapidly into cold running water wherein it is mechanically stirred. In this manner the condensation stage is arrested at the precise moment when the desired polymerizing is just on the point of completion. The water particles entering the mass during the mechanical stirring automatically ooze out therefrom when said mass is allowed to rest or settle for a time. If, however, the mass is to be used at once, the cooling water can be eliminated by centrifuging or by mangling said mass between the cold rollers of a double-roller calender.

2. The mixture of inert complementals can comprise, for instance, the following compounds:

|   | Grams. |
|---|---|
| 1. Kneadable mass | 1500 |
| Sawdust | 1000 |
| Colouring material, according to density | 100 to 750 |
| 2. Kneadable mass | 1500 |
| Sawdust | 1000 |
| Crushed glass | 800 |
| Colouring material according to density | 50 to 250 |
| or also | |
| 3. Kneadable mass | 1500 |
| Asbestos | 1500 |
| Colouring material according to density | 150 to 800 |

The above compounds can be suitably modified according to the uses for which the articles to be made are intended.

In order to mix the compound the quantity of kneadable mass to be treated is subjected to a few minutes mangling between the rollers of a double-roller calender which are heated to 40–50° C. thereby eliminating the last traces of cooling water. The complementals are then added and mangling is continued until very intimate mixture is obtained, and next the finished mixture is given the form of kneadable sheets of suitable thickness, which do not stick to the rollers and which behave like a rubber mixture such as used for ebonite manufacturing.

3. Moulding is effected in moulds made of metal, of plaster, of wood or of any other suitable material.

When metal moulds are used, the plastic and kneadable mixture is introduced into them by the injecting process, that is to say by means of a forcing piston. It is possible however, to operate according to the method usually employed for fashioning ebonite articles, that is to say by filling the mould with fragments of rolled sheets.

Any pieces or parts can be moulded without any limitation as to awkwardness of forms and sizes and without having to be put through any further machining whatsoever.

To sum up, the present invention greatly increases present manufacturing possibilities as to moulded pieces or parts made of Bakelite products, while ensuring far better economical conditions than any hitherto obtaining for any such products as Bakelites, galaliths, ebonites, etc.

In order to fashion articles in plaster, wooden or other moulds, that is to say in moulds not intended to serve as supports for the moulded articles during subsequent heating, the kneadable mass is spread in sheets or layers of suitable thickness on the mould cavities of the mould and forced thereinto by finger pressure.

This method is most efficient especially for objects of artistic character, imitations of carving or sculpture and such like.

4. Heating of the moulded articles is effective in the moulds themselves or without moulds.

*Heating in moulds.*

The moulds, filled as hereinabove explained and held between the heated plates of a hydraulic press, are submitted to a 120–180° C. temperature (degree determined according to the inert material introduced into the mixture) and to a pressure from 100 to 300 kilograms per square centimeter.

Heating duration is governed by the size of the moulded articles, say 15 minutes for small articles.

Once thus heated, moulded articles can be submitted, after removal from the mould, without any support being required, and at atmospheric pressure, to an extra heating in a dry room or stove heated by a hot air blast, such heating being conducted in the same temperature conditions as the one in the moulds.

*Heating without mould.*

Articles fashioned by forcing the material by hand into the cavities of plaster, wooden or other moulds are heated without any support in hot air under ordinary atmospheric pressure, and, for this purpose, they are placed in a stove or room heated by dry hot air on a bed of absorbent material, powderized chalk or clay or such like.

Heating is commenced at a comparatively low temperature, say 40 to 50° C., which is raised little by little up to 120° C. and over. This heating is protracted as long as necessary. Its proper duration is about four times the one of heating in moulds.

The kneadable mixture obtained by the process hereinabove described under paragraph 1 can be associated, in any proportion as to weight, with a soft rubber or with a hard rubber mixture. A product is thus obtained which, far less brittle than ordinary hard rubber, will well withstand heat, not change form, undergo no ulterior auto-reaction and will lend itself to machining far more readily than articles made of a pure Bakelite mass.

I claim as my invention:

A process for manufacturing condensation products from phenols and formaldehyde in the presence of alkaline-earth chlorides acting as catalyzing agents, said process being characterized by the fact that the phenols, together with formaldehyde, are heated while using a quantity of catalyzing agent exceeding 15% of the formaldehyde solution employed, until there are formed masses plastic, cold-kneadable and soluble in acetone and in alcohol, said solubility decreasing in direct ratio as the reaction proceeds without the kneadability being substantially affected.

In testimony whereof I affix my signature.

EDOUARD JEAN PAUL CLAUDE de JARNY.